US012225365B2

(12) United States Patent
Wang et al.

(10) Patent No.: US 12,225,365 B2
(45) Date of Patent: Feb. 11, 2025

(54) SPEAKER

(71) Applicant: Wistron Corporation, New Taipei (TW)

(72) Inventors: Xiao-Qin Wang, New Taipei (TW); Li-Ping Pan, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 150 days.

(21) Appl. No.: 17/852,464

(22) Filed: Jun. 29, 2022

(65) Prior Publication Data

US 2023/0292051 A1 Sep. 14, 2023

(30) Foreign Application Priority Data

Mar. 9, 2022 (TW) .................................. 111108651

(51) Int. Cl.
*H04R 9/02* (2006.01)
*H04R 9/06* (2006.01)
*H04R 17/00* (2006.01)

(52) U.S. Cl.
CPC ............... *H04R 9/025* (2013.01); *H04R 9/06* (2013.01); *H04R 17/00* (2013.01); *H04R 2400/11* (2013.01)

(58) Field of Classification Search
CPC .......... H04R 9/025; H04R 9/06; H04R 17/00; H04R 2400/11; H04R 9/04; H04R 9/043; H04R 3/00; H04R 7/122
USPC ....... 381/190, 396, 398, 412, 433, 421, 423, 381/424, 150, 173, 420, 430
See application file for complete search history.

(56) References Cited

U.S. PATENT DOCUMENTS

| | | | | |
|---|---|---|---|---|
| 4,418,248 A * | 11/1983 | Mathis | H04R 1/26 | 381/373 |
| 5,295,194 A * | 3/1994 | Christensen | H04R 17/00 | 381/396 |
| 10,250,995 B2 | 4/2019 | Doshida | | |
| 10,313,801 B2 | 6/2019 | Park et al. | | |
| 2008/0080736 A1* | 4/2008 | Sumitani | H04R 31/006 | 381/407 |
| 2014/0056468 A1* | 2/2014 | Kuze | H04R 31/006 | 381/414 |

FOREIGN PATENT DOCUMENTS

| | | |
|---|---|---|
| CN | 2483924 A | 3/2002 |
| CN | 2483924 Y | 3/2002 |
| CN | 101998216 A | 3/2011 |

(Continued)

OTHER PUBLICATIONS eESR dated May 24, 2023, listed in related European patent application No. 22193848.3.

(Continued)

*Primary Examiner* — Norman Yu
(74) *Attorney, Agent, or Firm* — McClure, Qualey & Rodack, LLP

(57) ABSTRACT

A speaker includes a frame, a vibration assembly and a magnetic circuit assembly. The vibration assembly is assembled on the frame. The magnetic circuit assembly is assembled on the frame. The vibration assembly includes a voice coil and a piezoelectric element, the voice coil and the piezoelectric element are arranged coaxially, and the voice coil is between the piezoelectric element and the magnetic circuit assembly.

18 Claims, 4 Drawing Sheets

(56) References Cited

FOREIGN PATENT DOCUMENTS

| | | | | |
|---|---|---|---|---|
| CN | 112261559 | A | | 1/2021 |
| JP | S5912700 | | * | 1/1984 |
| JP | S5912700 | A | | 1/1984 |
| JP | S6027300 | A | | 2/1985 |
| JP | S63279700 | A | | 11/1988 |

OTHER PUBLICATIONS

Examination report dated Mar. 10, 2023, listed in related Taiwan patent application No. 111108651.

* cited by examiner

SPEAKER

CROSS-REFERENCE TO RELATED APPLICATION

This non-provisional application claims priority under 35 U.S.C. § 119(a) to Patent Application No. 111108651 filed in Taiwan, R.O.C. on Mar. 9, 2022, the entire contents of which are hereby incorporated by reference.

BACKGROUND

Technical Field

The present disclosure relates to a speaker, in particular to a speaker having a piezoelectric element.

Related Art

In general, the speaker known to the inventor has a single voice coil. The single voice coil speaker does not perform well in high-frequency sound quality. In order to solve the problem of poor performance of high-frequency sound quality of the speaker, a tweeter is generally provided on the speaker to enhance the high frequency performance. However, the additionally provided tweeter increases the size and components of the speaker, resulting in extra costs.

SUMMARY

In view of this, according to one embodiment, a speaker is provided and comprises a frame, a vibration assembly, and a magnetic circuit assembly. The vibration assembly is assembled on the frame. The magnetic circuit assembly is assembled on the frame. The vibration assembly comprises a voice coil and a piezoelectric element. The voice coil and the piezoelectric element are arranged coaxially, and the voice coil is between the piezoelectric element and the magnetic circuit assembly.

In some embodiments, the vibration assembly further comprises a flange and a pot portion, the pot portion is cone-shaped, and the pot portion comprises a first ring edge and a second ring edge opposite to the first ring edge. A diameter of the first ring edge is greater than a diameter of the second ring edge. The first ring edge is connected to the flange, and the piezoelectric element is assembled on the second ring edge.

In some embodiments, the voice coil is connected to the pot portion.

In some embodiments, the vibration assembly further comprises a damper, the damper comprises a third ring edge and a fourth ring edge opposite to the third ring edge. A diameter of the third ring edge is greater than a diameter of the fourth ring edge. The third ring edge is connected to the frame, and the fourth ring edge is connected to the voice coil.

In some embodiments, the piezoelectric element is cone-shaped, and a top of the piezoelectric element faces the magnetic circuit assembly.

In some embodiments, the piezoelectric element is cone-shaped, and a top of the piezoelectric element is away from the magnetic circuit assembly.

In some embodiments, the flange comprises an outer ring and an inner ring opposite to the outer ring, the outer ring is connected to the frame, and the inner ring is connected to the pot portion.

In some embodiments, the flange further comprises a raised portion, and the raised portion is between the outer ring and the inner ring.

In some embodiments, the speaker further comprises a first conductive board and a second conductive board. The frame surrounds the vibration assembly to form a tubular wall, and the tubular wall comprises a first installation portion and a second installation portion. The first conductive board is assembled on the first installation portion, and the second conductive board is assembled on the second installation portion.

In some embodiments, the first conductive board is electrically connected to the piezoelectric element, and the second conductive board is electrically connected to the voice coil.

In some embodiments, the piezoelectric element comprises a support sheet and a piezoelectric material, and the piezoelectric material is attached to the support sheet.

In some embodiments, the magnetic circuit assembly further comprises a channel bar, a washer, and a main magnet, and the main magnet and the washer are assembled on the channel bar.

In some embodiments, a gap is between the main magnet, the washer, and the channel bar, and at least one portion of the voice coil is received in the gap.

In some embodiments, the magnetic circuit assembly further comprises a negative magnet, and the negative magnet is assembled on the main magnet through the washer.

In some embodiments, the voice coil is hollow cylindrical-shaped.

DETAILED DESCRIPTION

Figure 1:
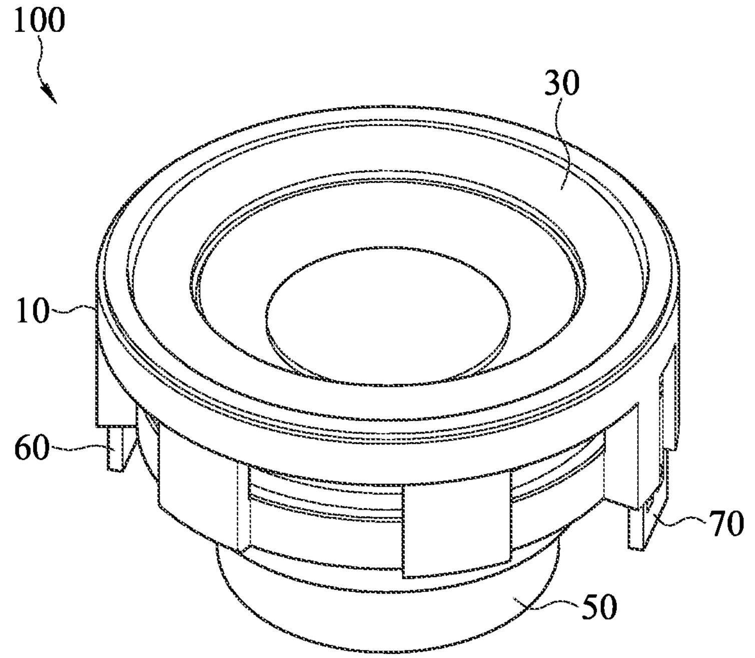
FIG. 1 illustrates a perspective view of a speaker according to one embodiment.
Figure 2:
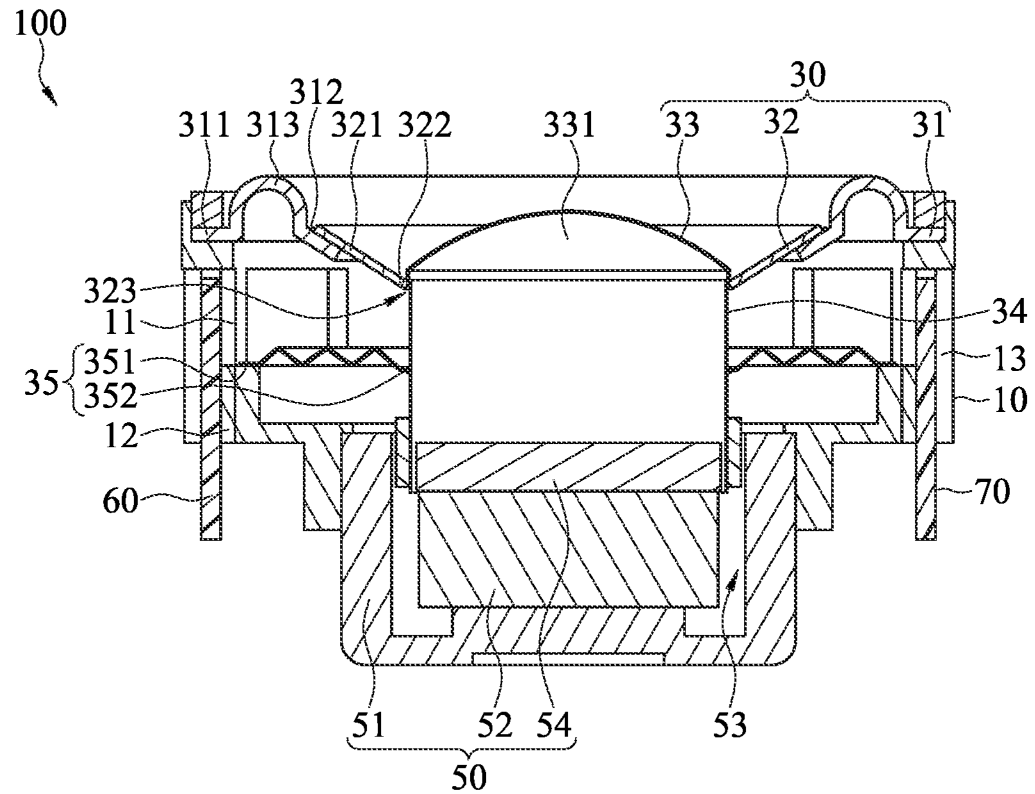
FIG. 2 illustrates a sectional view (1) of the speaker according to one embodiment.

Please refer to FIG. 1 and FIG. 2. FIG. 1 illustrates a perspective view of a speaker according to one embodiment. FIG. 2 illustrates a sectional view (1) of the speaker according to one embodiment. A speaker 100 comprises a frame 10, a vibration assembly 30, and a magnetic circuit assembly 50. In one embodiment, the speaker 100 may be applied to a sound box, an earphone, or an audio equipment of a car.

The vibration assembly 30 is assembled on the frame 10 and comprises a voice coil 34 and a piezoelectric element 33. In one embodiment, the vibration assembly 30 further comprises a flange 31 and a pot portion 32. The flange 31 is assembled on the frame 10. The pot portion 32 is cone-shaped, and the pot portion 32 comprises a first ring edge 321 and a second ring edge 322 opposite to the first ring edge 321. A diameter of the first ring edge 321 is greater than a diameter of the second ring edge 322. The first ring edge 321 is connected to the flange 31, and the piezoelectric element 33 is assembled on the second ring edge 322. The flange 31 comprises an outer ring 311 and an inner ring 312 opposite to the outer ring 311, the outer ring 311 is connected to the frame 10, and the inner ring 312 is connected to the pot portion 32. In one embodiment, the flange 31 further comprises a raised portion 313, and the raised portion 313 is between the outer ring 311 and the inner ring 312. In one embodiment, the pot portion 32 is recessed from the first ring edge 321 toward the second ring edge 322 and has a mounting portion 323 at the second ring edge 322. The first ring edge 321 is connected to the flange 31, and the piezoelectric element 33 is assembled on the second ring edge 322. In one embodiment, the flange 31 and the pot portion 32 are provided for hanging the piezoelectric element 33, and the piezoelectric element 33 is assembled on the mounting portion 323 of the second ring edge 322. In this way, the flange 31, the pot portion 32, and the piezoelectric element 33 perform the function of a dust cover to prevent dust and debris from falling into gaps of the speaker 100. The piezoelectric element 33 has various embodiments (described in detail later).

In one embodiment, the piezoelectric element 33 comprises a support sheet and a piezoelectric material, the piezoelectric material is attached to the support sheet. The piezoelectric material is a mixture of materials with piezoelectric properties (for example, barium titanate, lead zirconate titanate, modified lead zirconate titanate, lead metaniobate, lead barium lithium niobate, and modified lead titanate). The material of the support sheet is, for example, a metal or a plastic. The piezoelectric speaker 130 performs the equalization effect through the cooperation of the support sheet and the piezoelectric material.

The magnetic circuit assembly 50 is assembled on the frame 10. In one embodiment, the magnetic circuit assembly 50 further comprises a channel bar 51, a washer (guide magnet) 54, and a main magnet 52, and the main magnet 52 and the washer 54 are assembled on the channel bar 51.

The voice coil 34 and the piezoelectric element 33 are arranged coaxially, and the voice coil 34 is between the piezoelectric element 33 and the magnetic circuit assembly 50. In one embodiment, the voice coil 34 is hollow cylindrical-shaped. In one embodiment, a gap 53 is between the main magnet 52, the washer 54, and the channel bar 51, and at least one portion of the voice coil 34 is received in the gap 53. In one embodiment, the piezoelectric element 33 is arranged coaxially with the voice coil 34 to form a two-way speaker, so that the speaker 100 not only has the effect of enhancing the low-frequency sound quality but also has the effect of enhancing the high-frequency sound quality. Here, the vibration principles of the voice coil 34 and the piezoelectric element 33 are different. The voice coil 34 drives the diaphragm to produce sounds by using the force generated by the interaction between the magnetic field generated by the coil and the magnetic fields in the magnetic gap. On the other hand, in the piezoelectric element 33, the piezoelectric material is separated into two poles and electrified, so that the piezoelectric material is stretched to produce sounds. In one embodiment, the piezoelectric element 33 vibrates to produce high-frequency sounds, and at the same time the piezoelectric element 33 is driven by the voice coil 34 to vibrate the diaphragm to extend the sound range.

Figure 5:
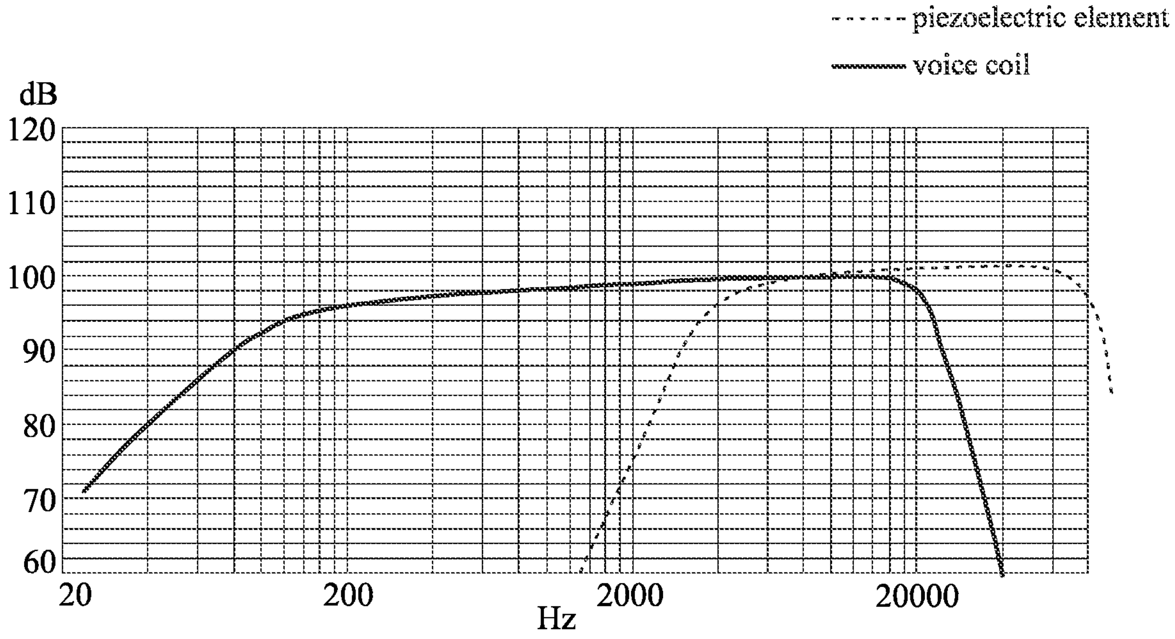
FIG. 5 illustrates a schematic view showing the effect of the speaker according to one embodiment.

Please refer to FIG. 5. FIG. 5 illustrates a schematic view showing the effect of the speaker according to one embodiment. Specifically, in this embodiment, by integrating the piezoelectric element 33 into the pot portion 32 and allowing the piezoelectric element 33 to be arranged coaxially with the voice coil 34, a two-way speaker is formed, so that the speaker 100 not only has the effect of enhancing the low-frequency sound quality but also has the effect of enhancing the high-frequency sound quality. As shown in FIG. 5, the horizontal axis represents frequency, the vertical axis represents volume, the solid line represents the voice coil, the dashed line represents the piezoelectric element. Specifically, since the sounds produced by the voice coil 34 will loss at high frequencies (as shown in FIG. 5, the volume of the solid line decreases in the high frequency region), the sound quality can only be maintained at low and medium frequencies. Therefore, in one or some embodiments, through the piezoelectric element 33, the performance of high-frequency sound quality is increased, and therefore the performance of sound quality is improved. In addition, the piezoelectric element 33 is utilized to replace the dust cover of the speaker known to the inventor. In this way, compared with the speaker known to the inventor, the speaker 100 has a simpler structure and a smaller body, which also reduces the production cost.

In one embodiment, the vibration assembly 30 further comprises a damper 35, the damper 35 comprises a third ring edge 351 and a fourth ring edge 352 opposite to the third ring edge 351. A diameter of the third ring edge 351 is greater than a diameter of the fourth ring edge 352. The third ring edge 351 is connected to the frame 10, and the fourth ring edge 352 is connected to the voice coil 34. In one embodiment, the damper 35 is a flat plate with wavy or zigzag-shaped. The damper 35 is connected to the voice coil 34 to limit the vibration of the voice coil 34 and to avoid the deviation of the voice coil 34. In one embodiment, the damper 35 of the vibration assembly 30 is an optional component, and the vibration of the voice coil 34 can also be assisted by the pot portion 32 by connecting the voice coil 34 to the pot portion 32.

Figure 3A:
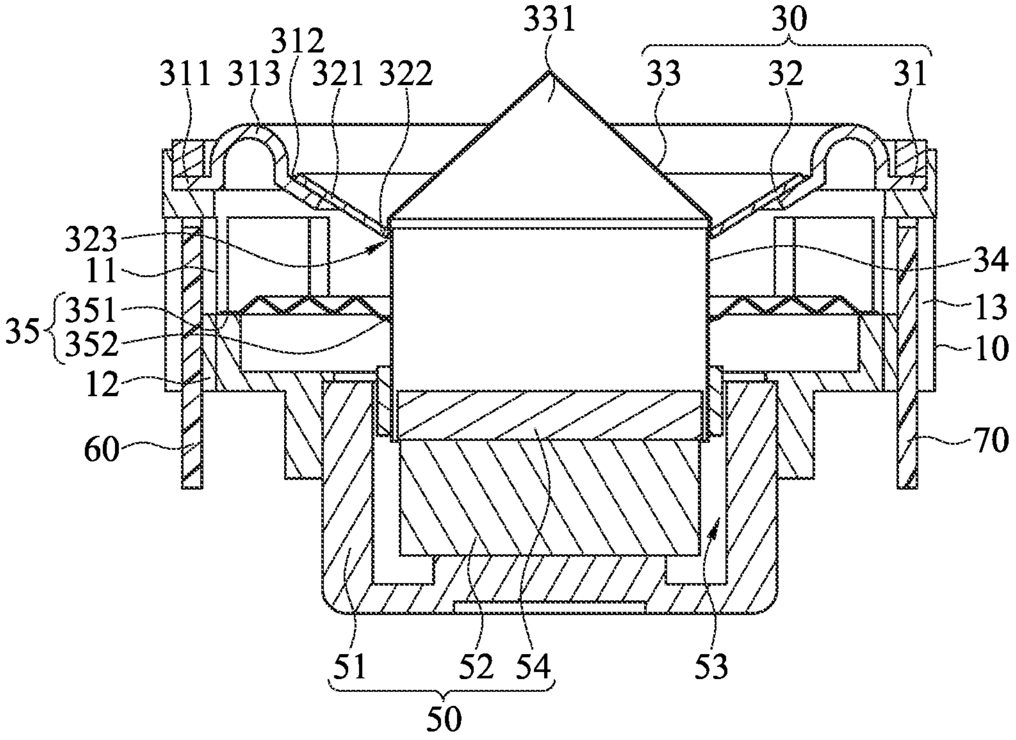
FIG. 3*a* illustrates a sectional view (1) of one embodiment of a piezoelectric element shown in FIG. 2.
Figure 3B:
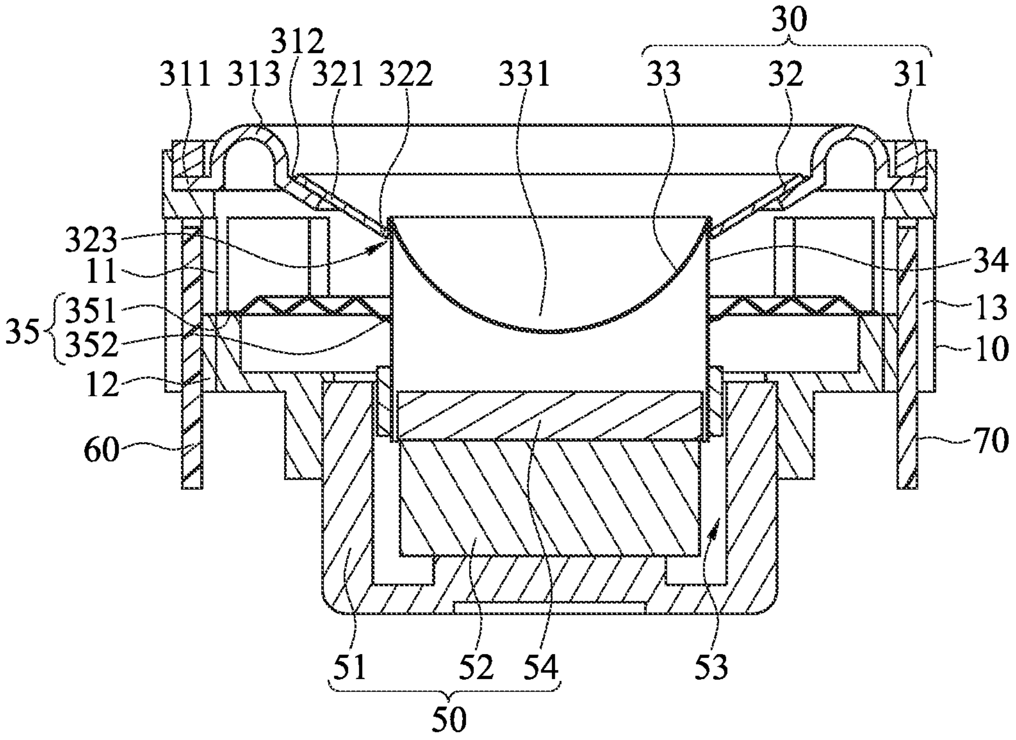
FIG. 3*b* illustrates a sectional view (2) of one embodiment of a piezoelectric element shown in FIG. 2.
Figure 3C:
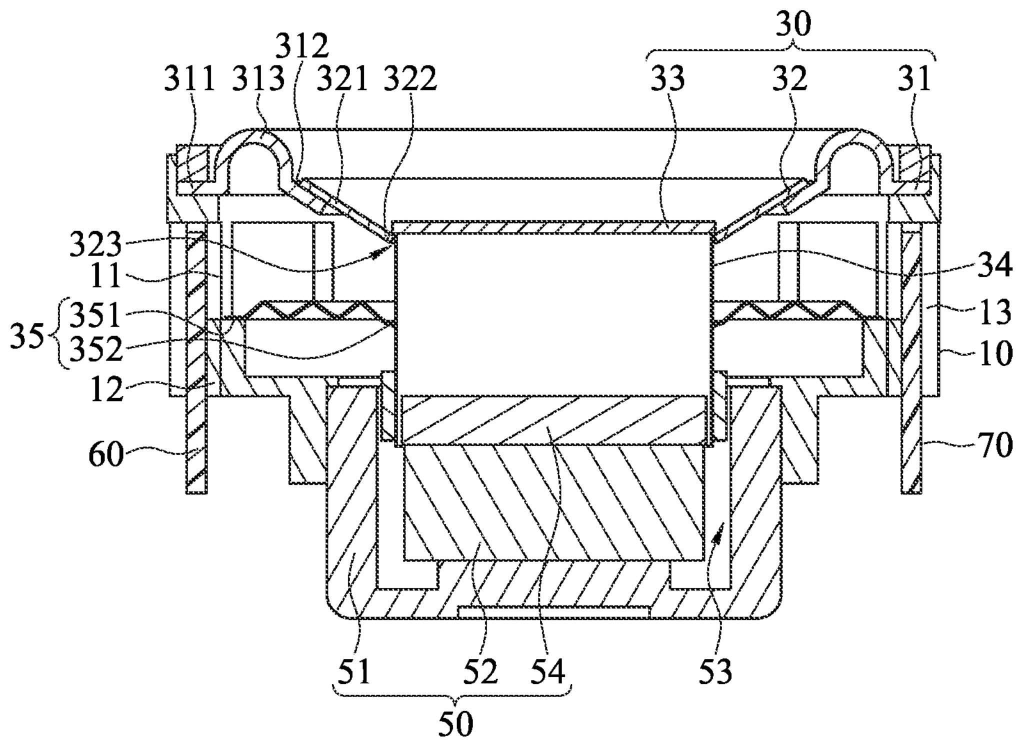
FIG. 3*c* illustrates a sectional view (3) of one embodiment of a piezoelectric element shown in FIG. 2.

Please refer to FIG. 3*a* to FIG. 3*c*. FIG. 3*a* illustrates a sectional view (1) of one embodiment of a piezoelectric element shown in FIG. 2. FIG. 3*b* illustrates a sectional view (2) of one embodiment of a piezoelectric element shown in FIG. 2. FIG. 3*c* illustrates a sectional view (3) of one embodiment of a piezoelectric element shown in FIG. 2. The piezoelectric element 33 has various embodiments. As shown in FIG. 2, a top 331 of the piezoelectric element 33 is away from the magnetic circuit assembly 50. Specifically, in this embodiment, the cross section of the piezoelectric element 33 is circular arc-shaped, and the top 331 in circular arc-shaped is away from the magnetic circuit assembly 50, that is, toward the top of FIG. 2.

The cross section of the piezoelectric element 33 is not limited to the circular arc-shaped. As shown in FIG. 3*a*, in one embodiment, the shape of the cross section of the piezoelectric element 33 is a triangle and the top 331 of the tringle is a sharp point. The piezoelectric element 33 has a high-frequency projection effect by protruding the top 331 upward and the sharp point faces the direction opposite to the direction toward the magnetic circuit assembly 50.

In one embodiment, as shown in as FIG. 3*b*, the top 331 of the piezoelectric element 33 faces the magnetic circuit assembly 50. Specifically, in this embodiment, the top 331 in circular arc-shaped is recessed toward the bottom of FIG. 3*b*.

In one embodiment, as shown in as FIG. 3*c*, the piezoelectric element 33 is flat plate-shaped. Specifically, in this embodiment, the piezoelectric element 33 is a flat plate. For example, the shape of the piezoelectric element 33 may be circular, triangular, or rectangular. In addition, the mounting portion 323 corresponds to the shape of the piezoelectric element 33.

Please refer to FIG. 2 again, in one embodiment, the speaker 100 further comprises a first conductive board 60 and a second conductive board 70. The frame 10 surrounds the vibration assembly 30 to form a tubular wall 11, and the tubular wall 11 comprises a first installation portion 12 and a second installation portion 13. The first conductive board 60 is assembled on the first installation portion 12, and the second conductive board 70 is assembled on the second installation portion 13. In one embodiment, the first installation portion 12 and the second installation portion 13 are located on opposite sides of the tubular wall 11. The first installation portion 12 and the second installation portion 13 are between the damper 35 and pot portion 32. The first conductive board 60 is electrically connected to the piezoelectric element 33, and the second conductive board 70 is electrically connected to the voice coil 34. In one embodiment, the second conductive board 70 is electrically connected to the voice coil 34. Moreover, in order to ensure that the voice coil 34 will not pull the wire electrically connected to the second conductive board 70 during the vibration of the voice coil 34, the length of the wire between the voice coil 34 and the second conductive board 70 is reserved.

Figure 4:
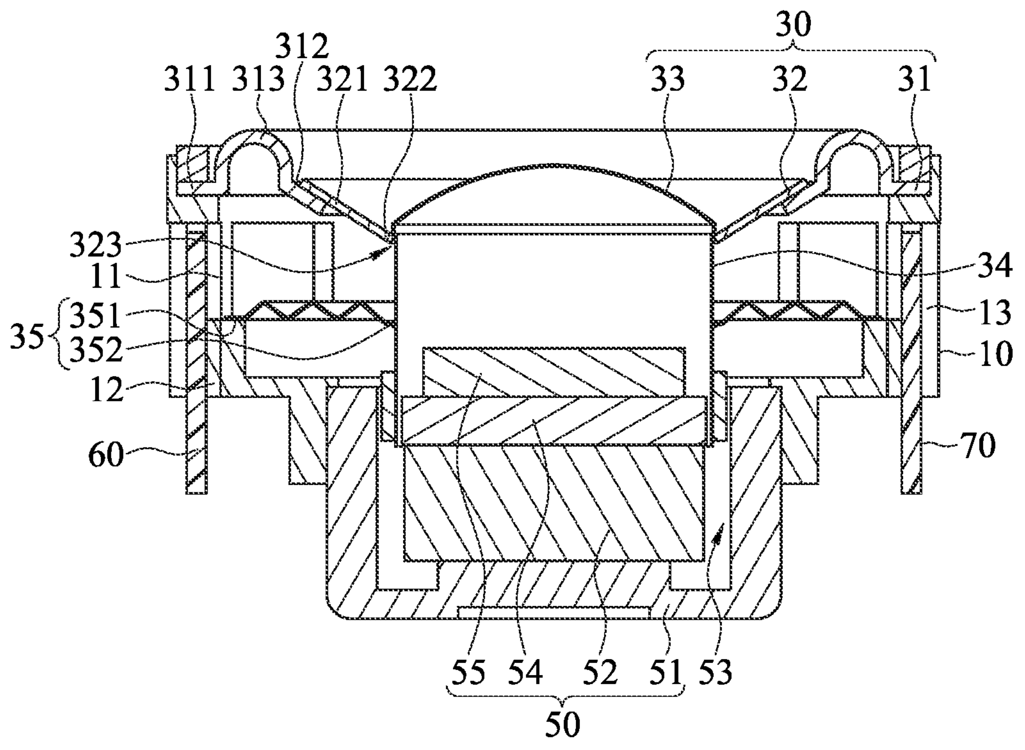
FIG. 4 illustrates a sectional view (2) of the speaker according to one embodiment.

Please refer to FIG. 4. FIG. 4 illustrates a sectional view (2) of the speaker according to one embodiment. The magnetic circuit assembly 50 further comprises a negative magnet 55, and the negative magnet 55 is assembled on the main magnet 52 through the washer 54. Specifically, in this embodiment, the magnetic circuit assembly 50 increases the magnetic flux through the negative magnet 55. Since the magnetic direction of the negative magnet 55 is opposite to that of the main magnet 52, the washer 54 between the main magnet 52 and the negative magnet 55 has a greater magnetic flux.

Based on the above, according to the speaker 100 provided in one or some embodiments of the present disclosure, by integrating the piezoelectric element 33 into the pot portion 32 and allowing the piezoelectric element 33 to be arranged coaxially with the voice coil 34, the two-way speaker is formed, so that the speaker 100 not only has the effect of enhancing the low-frequency sound quality but also has the effect of enhancing the high-frequency sound quality. In addition, the piezoelectric element 33 is utilized to replace the dust cover of the speaker known to the inventor. In this way, compared with the speaker known to the inventor, the speaker 100 has a simple structure and a smaller body, which also reduces the production cost.

What is claimed is:

1. A speaker, comprising:

a frame;

a vibration assembly assembled on the frame; and a magnetic circuit assembly assembled on the frame;

wherein the vibration assembly comprises a voice coil and a piezoelectric element, the voice coil and the piezoelectric element are arranged coaxially, and the voice coil is between the piezoelectric element and the magnetic circuit assembly;

wherein the piezoelectric element is cone-shaped, a shape of a cross section of the piezoelectric element is a triangle, a top of the tringle is a sharp point and the top of the piezoelectric element is away from the magnetic circuit assembly, and the sharp point faces a direction opposite to the direction toward the magnetic circuit assembly.

2. The speaker according to claim 1, wherein the vibration assembly further comprises a flange and a pot portion, the pot portion is cone-shaped, and the pot portion comprises a first ring edge and a second ring edge opposite to the first ring edge; a diameter of the first ring edge is greater than a diameter of the second ring edge; the first ring edge is connected to the flange, and the piezoelectric element is assembled on the second ring edge.

3. The speaker according to claim 2, wherein the voice coil is connected to the pot portion.

4. The speaker according to claim 2, wherein the vibration assembly further comprises a damper, the damper comprises a third ring edge and a fourth ring edge opposite to the third ring edge; a diameter of the third ring edge is greater than a diameter of the fourth ring edge; the third ring edge is connected to the frame, and the fourth ring edge is connected to the voice coil.

5. The speaker according to claim 1, wherein the piezoelectric element is flat plate-shaped.

6. The speaker according to claim 5, wherein the shape of the piezoelectric element is circular, triangular, or rectangular.

7. The speaker according to claim 1, wherein the piezoelectric element is cone-shaped, and a top of the piezoelectric element faces the magnetic circuit assembly.

8. The speaker according to claim 2, wherein the flange comprises an outer ring and an inner ring opposite to the outer ring, the outer ring is connected to the frame, and the inner ring is connected to the pot portion.

9. The speaker according to claim 8, wherein the flange further comprises a raised portion, and the raised portion is between the outer ring and the inner ring.

10. The speaker according to claim 1, further comprising a first conductive board and a second conductive board, wherein the frame surrounds the vibration assembly to form a tubular wall, and the tubular wall comprises a first installation portion and a second installation portion; the first conductive board is assembled on the first installation portion, and the second conductive board is assembled on the second installation portion.

11. The speaker according to claim 10, wherein the first conductive board is electrically connected to the piezoelectric element, and the second conductive board is electrically connected to the voice coil.

12. The speaker according to claim 1, wherein the piezoelectric element comprises a support sheet and a piezoelectric material, and the piezoelectric material is attached to the support sheet.

13. The speaker according to claim 1, wherein the magnetic circuit assembly further comprises a channel bar, a washer, and a main magnet, and the main magnet and the washer are assembled on the channel bar.

14. The speaker according to claim 13, wherein a gap is between the main magnet, the washer, and the channel bar, and at least one portion of the voice coil is received in the gap.

15. The speaker according to claim 13, wherein the magnetic circuit assembly further comprises a negative magnet, and the negative magnet is assembled on the main magnet through the washer.

16. The speaker according to claim 1, wherein the voice coil is hollow cylindrical-shaped.

17. A speaker, comprising:

a frame;

a vibration assembly assembled on the frame, wherein the vibration assembly comprises a flange, a pot portion, and a piezoelectric element; the pot portion is cone-shaped, and the pot portion comprises a first ring edge and a second ring edge opposite to the first ring edge; a diameter of the first ring edge is greater than a diameter of the second ring edge; the first ring edge is connected to the flange, and the piezoelectric element is assembled on the second ring edge; and a magnetic circuit assembly assembled on the frame, wherein the magnetic circuit assembly comprises a channel bar, a washer, a main magnet, and a negative magnet; the main magnet and the washer are assembled on the channel bar, and the negative magnet is assembled to the main magnet through the washer;

wherein the vibration assembly further comprises a voice coil and a damper, the voice coil and the piezoelectric element are arranged coaxially, and the voice coil is between the piezoelectric element and the magnetic circuit assembly; the damper comprises a third ring edge and a fourth ring edge opposite to the third ring edge; a diameter of the third ring edge is greater than a diameter of the fourth ring edge; the third ring edge is connected to the frame, and the fourth ring edge is connected to the voice coil;

wherein the piezoelectric element is cone-shaped, a shape of a cross section of the piezoelectric element is a triangle, a top of the tringle is a sharp point and the top of the piezoelectric element is away from the magnetic circuit assembly, and the sharp point faces a direction opposite to the direction toward the magnetic circuit assembly.

18. The speaker according to claim 17, further comprising a first conductive board and a second conductive board, wherein the frame surrounds the vibration assembly to form a tubular wall, and the tubular wall comprises a first installation portion and a second installation portion; the first conductive board is assembled on the first installation portion, and the second conductive board is assembled on the second installation portion; the first conductive board is electrically connected to the piezoelectric element, and the second conductive board is electrically connected to the voice coil.

* * * * *